United States Patent
Gueron et al.

(10) Patent No.: US 7,760,875 B2
(45) Date of Patent: Jul. 20, 2010

(54) ACCELERATING DIFFIE-HELLMAN KEY-EXCHANGE PROTOCOL WITH ZERO-BIASED EXPONENT WINDOWING

(75) Inventors: Shay Gueron, Haifa (IL); Vinodh Gopal, Westboro, MA (US)

(73) Assignee: Intel Corporation, Santa Clara, CA (US)

(*) Notice: Subject to any disclaimer, the term of this patent is extended or adjusted under 35 U.S.C. 154(b) by 1056 days.

(21) Appl. No.: 11/480,153

(22) Filed: Jun. 29, 2006

(65) Prior Publication Data

US 2008/0019512 A1 Jan. 24, 2008

(51) Int. Cl.
*H04L 9/00* (2006.01)
(52) U.S. Cl. .............................. 380/44; 380/28; 380/45; 380/277; 709/228; 713/100
(58) Field of Classification Search ...................... 380/44
See application file for complete search history.

(56) References Cited

U.S. PATENT DOCUMENTS

| | | | | |
|---|---|---|---|---|
| 5,321,752 | A * | 6/1994 | Iwamura et al. | 713/174 |
| 6,282,290 | B1 * | 8/2001 | Powell et al. | 380/28 |
| 6,748,410 | B1 * | 6/2004 | Gressel et al. | 708/491 |
| 6,925,563 | B1 * | 8/2005 | Jennings | 713/174 |
| 7,076,061 | B1 * | 7/2006 | Lenstra et al. | 380/44 |
| 7,127,063 | B2 * | 10/2006 | Lambert et al. | 380/44 |

OTHER PUBLICATIONS

Avanzi, R.M., 'On Multi-Exponentiation in Cryptography', Citeseer, Oct. 28, 2002, entire document, http://citeseer.ist.psu.edu/cache/papers/cs/26733/http:zSzzSzeprint.iacr.orgzSz2002zSz154.pdf/avanzi02multiexponentiation.pdf.*
Gordon, D.M., 'A survey of fast exponentiation methods', Center for Communications Research, Dec. 30, 1997, entire document, http://www.ccrwest.org/gordon/jalg.pdf.*
Park,H.,et al,'Analysis of the Variable Length Nonzero Window Method for Exponentiation',1999 Elsevier Science, Computers & Mathematics with Applications 37, pp. 21-29, http://www.sciencedirect.com/science?_ob=MImg&_imagekey=B6TYJ-3WKXRBK-3-2&_cdi=5620&_user=2502287&_pii=S089812219900084X&_orig=search&_coverDate=04%2F30%2F1999&_sk=999629992&view=c&wchp=dGLbVtb-zSkWA&md5=16b085d554dcc7dfa3896bc85821120a&ie=/sdarticle.pdf.*

* cited by examiner

*Primary Examiner*—Edan Orgad
*Assistant Examiner*—Ronald Baum
(74) *Attorney, Agent, or Firm*—Blakely, Sokoloff, Taylor & Zafman LLP (57) ABSTRACT

A method for improving performance in exponentiation algorithms for encryption programs such as the Diffie-Hellman key-exchange protocol. The program determines if a standard exponentiation algorithm or an algorithm optimized for reduced memory are optimal for a given circumstance. The optimized algorithms may use zero-biased exponents to minimize the number of precomputed vectors needed and the number of multiplication operations required.

14 Claims, 7 Drawing Sheets

FIG. 5B though the Diffie-Hellman key-exchange with zero-biased exponent windowing

ACCELERATING DIFFIE-HELLMAN KEY-EXCHANGE PROTOCOL WITH ZERO-BIASED EXPONENT WINDOWING

BACKGROUND

1. Field of the Invention

The invention relates to a method for improving performance of algorithms relying on exponentiation using randomly generated exponents. Specifically, embodiments of the invention include a method for improving the performance of the Diffie-Hellman key-exchange protocol.

2. Background

Secure communication relies on cryptography to encode messages. In some cryptographic systems, keys are utilized to encode and decode these messages. Current cryptographic protocols perform operations on keys, such as public keys, where operands may be 512 to 1024 bits in length. It is anticipated that in the future operands may increase in size to 2048 or 4096 bits. As a result, designers of cryptographic programs and hardware must design efficient algorithms for processing these large operands for timely operation. The programs and hardware also need to be able to fit within local memory for sake of speed. Also, the larger the amount of memory required the greater the space and power consumption.

In addition to the large operands, many cryptographic programs utilize precomputed values to minimize the amount of computation needed. Multiplication and exponentiation are common operations carried out by cryptographic programs. However, using precomputed values trades processing efficiency for memory space. The larger the number and size of precomputed values the greater the speed and efficiency and the more memory that is required.

Cryptographic programs and hardware are increasingly being used in smaller devices with fewer resources. Examples of small devices include networking cards, smartcards, cellular phones and similar devices. These devices have limited resources including limited memory and processing power. Providing encryption as embedded software or hardware requires the availability of more memory and processing power which, increases the expense of these devices or results in poor performance.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

In the following description, for the purpose of explanation, numerous specific details are set forth in order to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
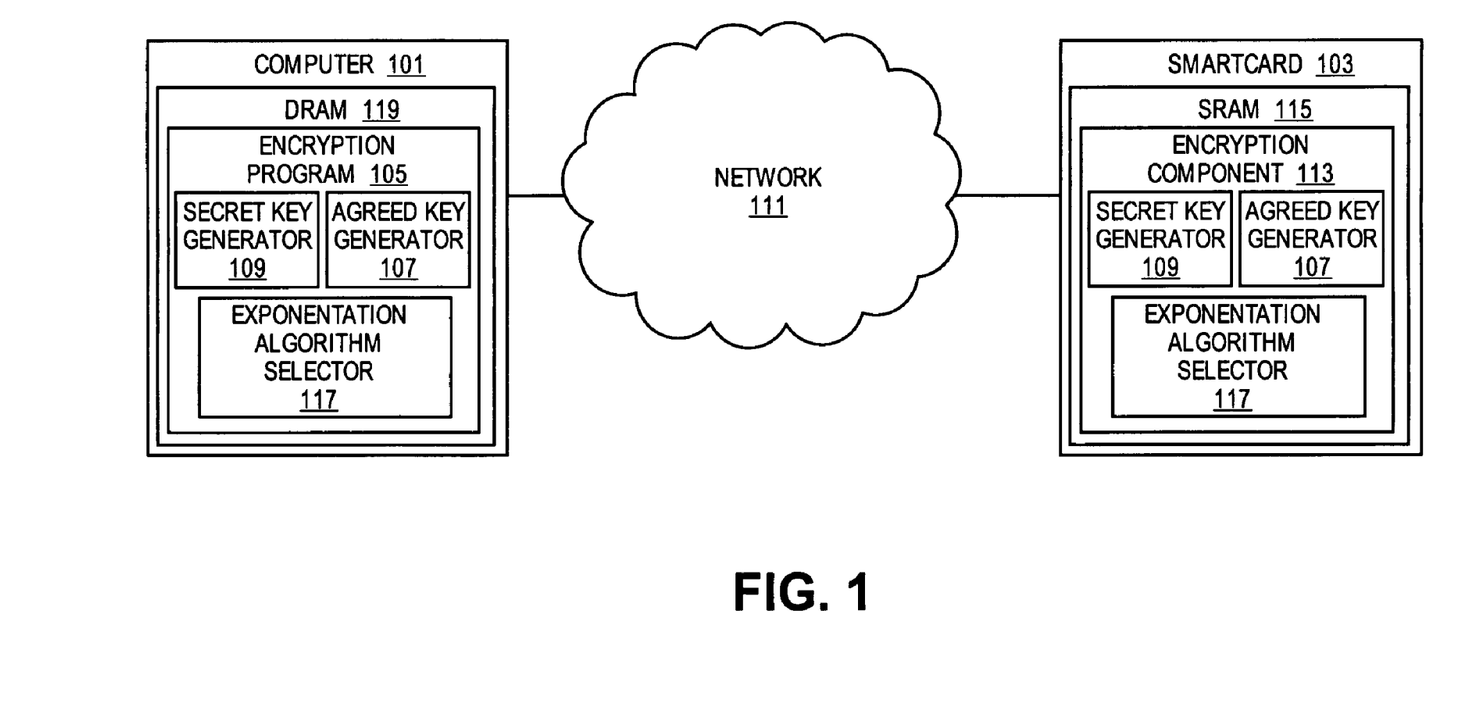
FIG. 1 is a diagram of one embodiment of a system using the optimized cryptographic system.

FIG. 1 is a diagram of one embodiment of a system utilizing an optimized encryption system. The system may include two devices that are attempting to communicate with one another securely. Any type of devices capable of communication may utilize the system. For example, the system may include a first computer 101 attempting to communicate securely with a smartcard 103. Devices that use the optimized encryption system may include, computers, handheld devices, cellular phones, gaming consoles, wireless devices, smartcards and other similar devices. Any combination of these devices may communicate using the system.

Each device may include or execute an encryption program 105. The encryption program 105 may be a software application, firmware, an embedded program, hardware or similarly implemented program. The program may be stored in a non-volatile memory or storage device or may be hardwired. For example, a software encryption program 105 may be stored in system memory 119 during use and on a hard drive or similar non-volatile storage. System memory may be dynamic random access memory. The encryption program 105 may utilize any encryption protocol including Menezes-Qu-Vanstone, IPsec, Station-to-Station and similar protocols. In one example embodiment, the encryption program may include a Diffie-Hellman key-exchange protocol.

The encryption program 105 may include a secret key generator 109 component that generates a secret key for a key-exchange protocol. The encryption program 109 may also include an agreed key generator 107 component. The agreed key generator 107 may utilize the secret key from the encryption program 113 of the device 103 in communication with the device 101 running the encryption program 105. Both the secret key generator 109 and the agreed key generator 107 may also utilize a public prime number and a public base or generator. The public prime and base or generator are shared between the two communicating devices 101, 103. The encryption program 105 may also include an exponentiation algorithm selector 117 that determine the optimal algorithm for exponentiation as described further herein below.

The encryption program may be used for communication with devices over a network 111. The network 111 may be a local area network, wide area network or similar network. The network 111 may utilize any communication medium or protocol. In one example embodiment, the network 111 may be the Internet. In another embodiment, the devices may communicate over a direct link including wireless direct communications.

In one example embodiment, an encryption component 113 may be part of a smartcard 103 or similar device. The encryption component 113 may be software stored or embedded on a static RAM (SRAM) 115, implemented in hardware or similarly implemented. The encryption component may include a secret key generator 109, agreed key generator 107 and exponentiation algorithm selector 117.

Figure 2:
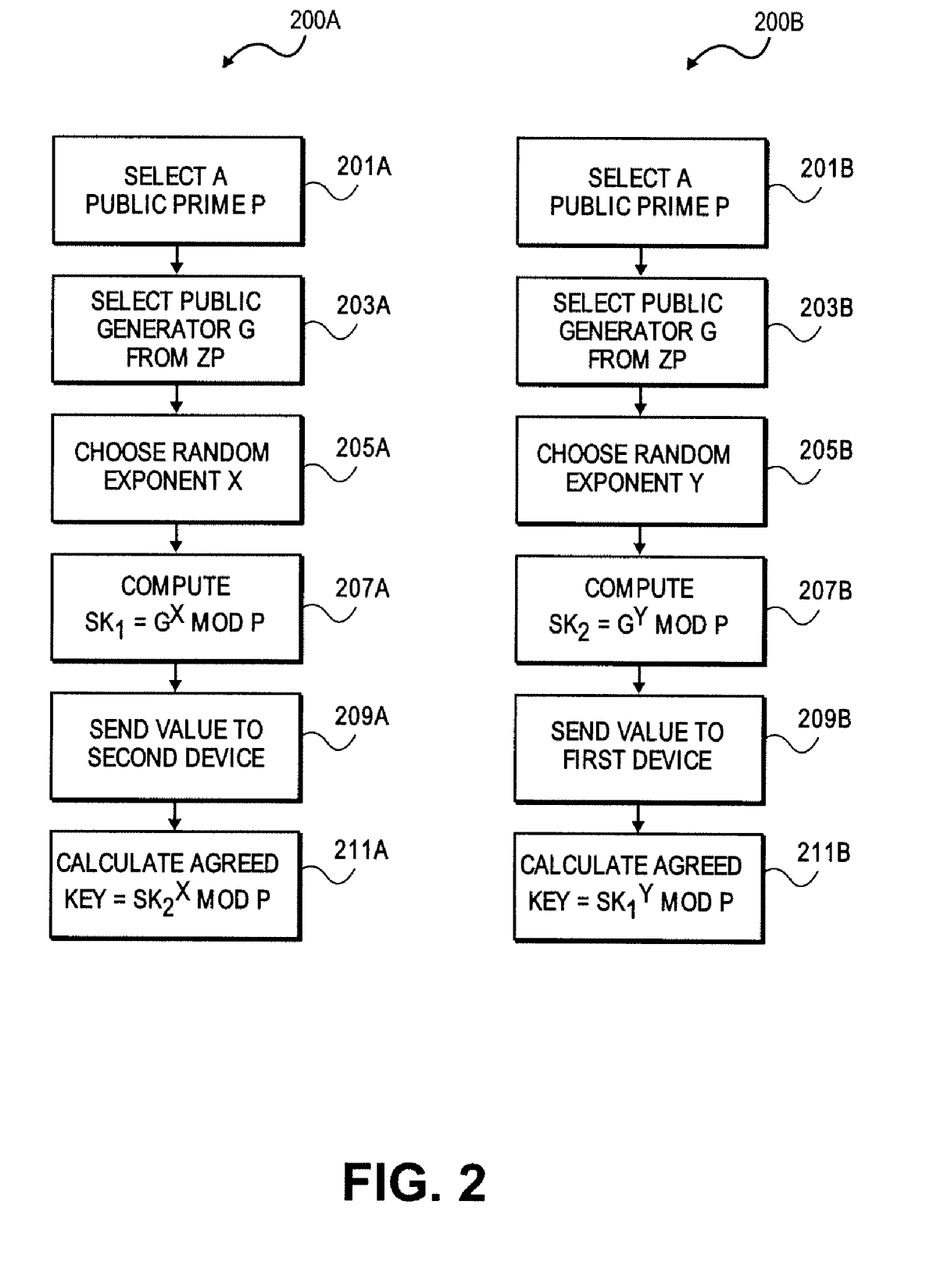
FIG. 2 is a flowchart of one embodiment of a key-exchange protocol.

FIG. 2 is a flowchart of one embodiment of an example key-exchange protocol. The key-exchange protocol is symmetrical. A first communicating device is represented on the left side 200A and the other device in communication with the first is represented on the right side 200B. Each device determines a public prime number (P) to generate a secret key (SK) and the ultimate agreed key (AK) (block 201A, 201B). The prime number P may be any prime number. This prime number P is public and available to anyone including the other communicating device and potential eavesdroppers.

A public generator (G) or base may then be selected to be shared between each device (block 203A, 203B). In one example embodiment, the generator G may be selected from $Z_p$. In one embodiment, $Z_p$ may be a set of numbers containing any number less than the prime P. The generator G is another number, algorithm or formula that is used in generating the secret key SK and agreed key AK. This generator G is also public and available to the other communication device and potential eavesdroppers.

The prime P and generator G are public, so that these may be communicated in the open prior to the establishment of the secure encrypted communication without jeopardizing the encrypted communication. An eavesdropper attempting to listen to the encrypted communication may obtain the prime P and generator G, but they are insufficient for determining the agreed key AK needed to decipher the communication.

Each device chooses a random number to be an exponent in the key generation (block 205A, 205B). These numbers X and Y are not known to the other devices at the time they are generated. These numbers may be any number or a number within a range defined by the protocol. The numbers are then used to generate two secret keys ($SK_1$ and $SK_2$) using the formulas $SK_1=G^X$ modulo P and $SK_2=G^Y$ modulo P (block 207A and 207B). These secret keys are then sent to the other device, respectively (block 209A and 209B). These secret keys are not encrypted and may be obtained by an eavesdropper. However, these secret keys SK and the public prime P and generator G are still insufficient to determine the agreed key. The agreed key AK is determined using the formulas $AK=SK_2^X$ modulo P and $AK=SK_1^Y$ modulo P (blocks 211A and 211B). Each device derives the same agreed key AK in this manner.

The computation required to derive the agreed AK key involves the selection of a random number and two modular exponentiations. The random number generation has an entropy or randomness level of n. The entropy level n may be any level dependent on the size of the random number and range from which it can be selected. If the bits of the secret keys are drawn randomly from a uniform distribution then the number of bits of X (x) and the number of bits of Y (y) are equivalent to the entropy level n.

In one embodiment, the modular exponentiations may be calculated using a windowing exponentiation algorithm. For example, a fixed window or sliding window exponentiation algorithm may be utilized. The computation cost of these algorithms varies dependent on the exponent chosen. There are two basic operations that are utilized in the exponentiation algorithms: squaring and multiplication. Multiplication is more computationally expensive than squaring. Thus, those exponents that require fewer multiplications are less computationally costly than exponents that require more multiplications.

In one embodiment, the exponents used may be modified or restricted to a set of exponents that are computationally less costly. The exponents are modified to require fewer multiplications. However, to maintain the same level of security provided by the original randomly generated exponent, the new exponents must have the same level of entropy n. To maintain the same level of entropy the modified exponents may be larger. For example, the modified exponents may have more bits than the original exponent.

An additional consideration in optimizing the exponentiation windowing algorithms is the amount of available memory. The performance of an exponentiation windowing algorithm is affected by the type of windowing algorithm and the window size (W) utilized. For example, the optimal window sizes for exponents that are larger than 512 bits in length are greater than four. The windowing algorithms require data storage space for a precomputed window table of vectors that grows as $2^W-1$ for fixed windowing or $2^{W-1}$ for sliding windowing. The vectors are proportional in size to the modulus size. Devices with limited memory available my be forced to use less than optimal window sizes, such as windows of size one, two, three or four dependent on the amount of available memory. Each reduction in window size causes a significant reduction in performance.

Modified fixed and sliding window exponentiation algorithms may be used to improve memory utilization. These modified exponentiation algorithms may improve performance and memory usage by not requiring that precomputed window tables have a number of vectors that must be a power of two for sliding windows or power of two minus one for fixed windows. In one embodiment, the number of vectors may be reduced by replacing certain sequences in the exponents with zeros, thereby creating zero-biased exponents. In another embodiment, sequences within the exponent may be replaced with other values. For sake of convenience the zero-biased embodiment is discussed herein as an example. The modified exponentiation algorithms are optimized for the zero-biased exponents and may be considered a zero-biased window exponentiation algorithm, such as a zero-biased fixed window algorithm or a zero-biased sliding window algorithm or similar algorithm. However, the zero-biased exponentiation algorithms may not be better than the standard fixed and sliding window algorithms in all cases.

Figure 3:
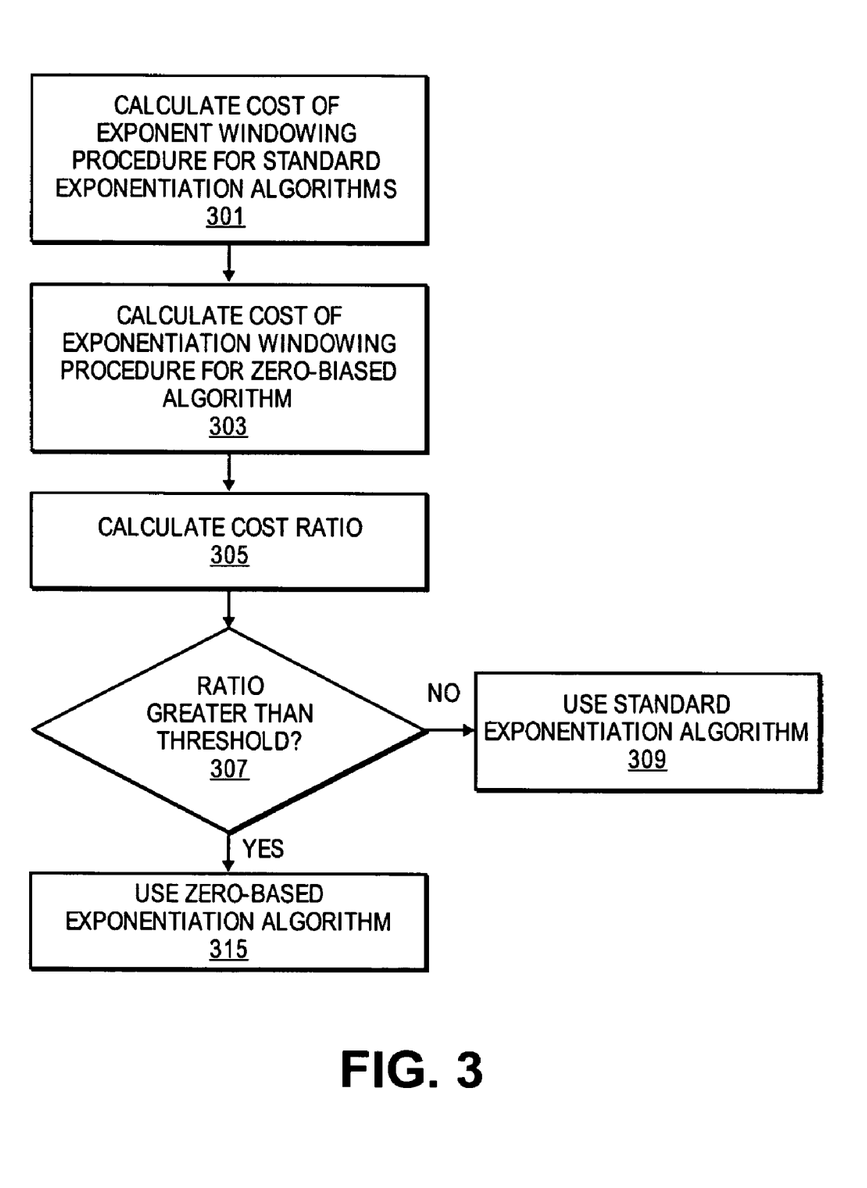
FIG. 3 is a flowchart of one embodiment of a process for optimum algorithm selection.

FIG. 3 is a diagram of one embodiment of a process for determining whether to use a zero-biased exponentiation algorithm or a standard exponentiation algorithm. In one embodiment, the cost of a modular exponentiation for a standard exponent and algorithm are calculated (block 301). In one example, the computational cost may be calculated as:

$$(SQR + (2^r - 3)MUL) + \left(\frac{n}{r} - 1\right)\left(rSQR + \frac{2^r - 1}{2^r} MUL\right)$$

for a fixed window algorithm where r is the largest window size allowed by the standard fixed window algorithm and SQR is the computational cost of a squaring operation, and MUL is the computation cost of a multiplication operation. In another example, the computational cost may be approximated as:

$$(n - r)SQR + \left(2^{r-1} - 1 + \frac{n}{r+1}\right)MUL$$

for a sliding window algorithm where the spacing between windows is expected to be 1. The expected effective length of a window is r+1 and the number of windows is n/(r+1).

The cost of the equivalent zero-biased method is then calculated (block 303). In one example, the computational cost for a zero-biased fixed window exponentiation may be calculate as:

$$(SQR + (M-2)MUL) + \left(\frac{m}{s} - 1\right)\left(sSQR + \frac{M}{2^s}MUL\right)$$

where m is number of bits in the zero-biased exponent and s is the largest window size allowed by the zero-biased algorithm. M is the number of vectors that have been calculated.

In another example, the computational cost for a zero-biased sliding window exponentiation may be approximated as:

$$(m-s)SQR + \left(\left(\frac{m}{s+1} - 1\right)\frac{M}{2^{s-1}}\right)MUL.$$

The approximation accounts for the precomputation of one modular square, (M−1) modular multiplications and an additional modular multiplication if the first window is even. Per each one of the m/(s+1) windows, s modular squares are executed and on average $(2^{s-1}-M)/2^{s-1}$ modular multiplications are executed. An additional modular square is assumed for the offset window of expected length s+□ where □ is the length of the offset.

In one embodiment, the values derived from the cost calculations are used to determine a cost ratio (block 305). The cost ratio (R) may be calculated by dividing the zero-biased cost by the standard cost or vice versa. The cost ratio R may then be compared to a threshold value to determine if the zero-biased exponentiation method is more effective than the standard method for the given situation (block 307). The value of the ratio R is heavily dependent on the ratio of the cost of squaring (SQR) to the cost of multiplication (MUL) and to a lesser extent on the size of the exponent (n). The analysis of the ratio R may be simplified in some instances by focusing on specific cases such as when r=s−1 where r represents a windows size that would be used with a standard algorithm and s represents the window size for a zero-biased algorithm. In one example, M may be analyzed over the range of $2^{s-1}$ to $2^s-1$. In one embodiment, the threshold comparison is to 1. A ratio R greater than 1 indicates that the zero-biased algorithm is more efficient than the standard algorithm.

The following are a set of examples of cases for analysis. It is assumed in these cases that the exponent strings are as large as 512 bit to 2048 bits or larger.

EXAMPLE 1

Assume that MUL/SQR=2, r=2, s=3, and M=4, 5, or 6. M=7 is not evaluated because in that case it would directly fit the procomputed tables for fixed window size of 3. For M=4 and 5, R is less than 1, so the zero biased method is not as efficient as the standard method, but for M=6, R=~1.0675 an approximately 7% improvement over the standard windowed exponentiation when the zero-biased exponentiation is used.

EXAMPLE 2

Assume that MUL/SQR=1.2, r=3, s=4 and M=8, 9, 10, 11, 12, 13 or 14. For M=8 through 12, the zero-biased exponentiation is not more efficient. For M=13 and 14, the zero-biased exponentiation is more efficient, 0.5% and 3%, respectively.

EXAMPLE 3

Assume that MUL/SQR=1 (worst case), r=2, s=3, and M=4, 5 or 6. For M=4 and 5 the zero-biased exponentiation is not more efficient. For M=6 a 0.72% improvement is provided by the zero biased exponentiation.

EXAMPLE 4

Assume that MUL/SQR=1 (worst case), r=3, s=4 and M=8, 9, 10, 11, 12, 13 or 14. For M=8 through 13, the zero-biased exponentiation is not more efficient. For M=14 a 2.4% improvement is provided by the zero-biased exponentiation.

Table 1 shows a set of example scenarios demonstrating the relative gain in efficiency when using the zero-biased exponentiation.

| Group | MUL/SQR | S | Relative Gain (%) |
|---|---|---|---|
| DH $Z^*_p$ | 1 | 2 | −10 |
| DH $Z^*_p$ | 1 | 3 | 0.72 |
| DH $Z^*_p$ | 1 | 4 | 2.4 |
| EC GFP | 1.4 | 2 | −5.6 |
| EC GFP | 1.4 | 3 | 3.4 |
| EC GFP | 1.4 | 4 | 4 |
| EC GF($2^n$) | 2 | 2 | 0 |
| EC GF($2^n$) | 2 | 3 | 6.75 |
| EC GF($2^n$) | 2 | 4 | 6.2 |

The groups are sets of numbers over which a key exchange protocol such as the Diffie-Hellman protocol may operate. These sets of numbers may be cyclic groups. DH stands for Diffie-Hellman and the DH $Z^*_p$ group is a cyclic group based on the prime number P. EC stands for Elliptic Curve which is a cyclic group with two subgroups based on primes. The first subgroup is the EC Galois-field prime (GFP). The second subgroup includes binary polynomials called EC Galois-field (GF) having an n-bit Galois-field of characteristic 2 (2n). Other similar groups may also be utilized.

In one embodiment, if the ratio R fails to exceed the threshold then the standard windowing exponentiation algorithm may be utilized (block 309). Any windowing algorithm may be utilized that matches the efficiency of the cost calculation described above. For example, a fixed window exponentiation algorithm or sliding window exponentiation algorithm may be utilized.

In one example embodiment, the input for the fixed window exponentiation algorithm may be a public prime P, a public generator G or base that is an integer greater than 1 and less the prime P. An exponent X may be generated or provided that is a string of n bits in length. The primary task of the fixed window exponentiation algorithm is to calculate the secret key and the agreed key with the formula $A^X$ mod P, where A is the generator G or the secret key SK. For this example, it is assumed the window size W divides the exponent bits n evenly such that the number of windows (t)=n/W. Each window sized block in the exponent X may be labeled $E_0$ through $E_t$.

A table of vectors is precomputed to improve the efficiency of fixed window exponentiate algorithm. There are $2^W-1$ vectors (V). These vectors V may be thought of as indexed (i) such that $V_i = A^i$ mod P, for all i from 1 to $2^W-1$. These vector values may be looked up to avoid having to recalculate them each time they occur. Given these assumptions an example fixed window exponentiation algorithm may be expressed in pseudo-code as:

```
Set q = E_{t−1}
Set T (running total) = V_q (except when q = 0, then make T = 1)
For k from (t−2) down to 0 do
    Set q = E_k
    Repeat (T = T² mod P) W times
    If q is not equal to 0, then T = T V_q mod P
End
Return T
```

Thus, in this example if W=1 then the fixed window exponentiation algorithm reduces to the standard square and multiply exponentiation algorithm. The standard square and multiplication algorithm requires one modular square per exponent bit, except for the most significant bit, plus one modular multiplication if the most significant bit equals 1. The use of a larger windows size W (W>1) trades memory for performance gain. The precomputation of the vectors requires one modular square and ($2^w-3$) modular multiplications. Then, for each of the windows, except the first there are W(t−1) modular squares and at most one modular multiplication.

Example standard fixed window execution:

```
Parameters : n = 15, w = 3, X = 21050_{(10)} = [01001000111010]_{(2)}
Here, t = 5 and X is written as t W-bit windows,
X = [(101)(001)(000)(111)(010)]_{(8)}
The fixed window steps of the fixed window algorithm are:
```

```
E_4 = 5: T = A^5 mod P (for the first block (window) E_4 = 5; A^5 mod P
    is read from the pre-computed table)
E_3 = 1: (repeat w = 3 times) T = T² mod P, T = T² mod P, and T = T * A¹
    mod P (→T = A^{41} mod P)
E_2 = 0: (repeat w = 3 times) T = T² mod P, T = T² mod P, T = T² mod P,
    and no multiplication (→T = A^{328} mod P)
E_1 =7: (repeat w=3 times) T=T² mod P, T=T² mod P, T=T² mod P,
    and T = T * A^7 mod P (→T = A^{2631} mod P)
E_0 = 2: (repeat w = 3 times) T = T² mod P, T = T² mod P, T = T² mod P,
    and T = T * A² mod P (→T = A^{21050} mod P)
```

In this example, the algorithm requires 12 modular squares and 3 modular multiplications.

In another example embodiment, the standard sliding window exponentiation algorithm may be utilized. The sliding window exponentiation algorithm improves on the fixed window exponentiation algorithm by increasing the effective window size by one. The sliding window exponentiation algorithm requires a smaller table thereby reducing the number of pre-computations. A precomputed table of $2^{w-1}$ vectors of length p are calculated, each containing a value for $A^i$ mod P for odd indices (i=1, 3, 5 ... $2^{W-1}$). The precomputation requires one modular square and $2^{W-1}-1$ modular multiplications.

During exponentiation, the exponent X is partitioned into windows of size W, each starting with a 1 bit, where between the windows there is an offset window, denoted Δ, that consists of δ consecutive zero bits (δ may equal 0 if there is no space between windows). The exponent X may be written as a sequence of windows and offset windows $E_0$ and $\Delta_0$, $E_1$ and $\Delta_1$, $E_2$ and $\Delta_2$ ... etc. For sake of simplicity, it is assumed for this example that the last window E has a length of W and the last offset Δ a length of δ.

For each window we can write $E=2^v u$ for some odd $1 \leq u \leq 2^w-1$. Per each window (except the first one), we perform (w−v) modular squares, one modular multiplications, and then v additional modular squares. For each offset window Δ of δ consecutive zero, we perform δ modular squares. The algorithm may be presented as follows:

Sliding Window Exponentiation

```
Input: P (modulus), 1 < A ≤ P−1 (base), X = [E_h Δ_h E_{h−1} Δ_{h−1} E_{h−2}...E_o Δ_o]
    (n bits exponent), w (window size).
Output: A^X mod P
1. Table pre-computation: V_I=A^I mod P, for all odd indices I, 1 ≤ i ≤ 2^w−1
2. Sliding Window Steps
Set q = E_{t−1} _ 2^v u for odd u ≤ 2^w −1 and v ≤ w−1.
Set T = V_q
Repeat (T = T² mod P) for times
For k from (h−1) down to 0 do
Set q = E_{k−1} _ 2^v u for odd u such that 1 ≤ u ≤ 2^w −1 and 0 ≤ v ≤ w−1.
Repeat (T = T² mod P) for (w−v) times
T = T V_u mod P
Repeat (T = T² mod P) for v times
Read the offset window Δ of δ consecutive zero bits.
Repeat (T = T² mod P) for δ times
End
```

Example Sliding Window Execution

Parameters: $X=(38165393)_{(10)}=$ $(10010001100101101110010001)_{(2)}$ and w=4. The exponent string X may be partitioned as (1001) (000) (1100) ( ) (1011) (0) (1110) (0) (1000) ( ) (1) ( ). Here, the exponent string consists of five E Δ pairs consisting of a 4-bit window E followed by an offset window Δ of some length δ (including 0 for null offset windows), and one last pair $E_0\Delta_0$ with $E_0$ of length 1 and a null $\Delta_0$. The algorithm performs the following operations

```
E_5 Δ_5 = (1001) (000)
    T = A^9, T = T², T = T², T = T² (→T = A^{72})
E_4 Δ_4 = (1100) ( )
    T = T², T = T², T = T*A³, T = T², T = T2 (→ T = A^{1164})
E_3 Δ_3 = (1011) (0)
    T = T², T = T², T = T², T = T², T = T*A^{11}, T = T² (→ T = A^{37270})
E_2 Δ_2 = (1110) (0)
    T = T², T = T², T = T², T = T*A^7, T = T², T = T² (→ T = A^{1192668})
E_1 Δ_1 = (1000) ( )
    T = T², T = T * A, T = T², T = T², T = T² (→ T = A^{19082696})
E_0 Δ_0 = (1) ( )
    T = T², T = T * A (→ T = A^{38165393})
```

Returning to the discussion of FIG. 3, if however, the ratio R exceeds the threshold, then a zero-biased algorithm may be selected to execute and a zero-biased exponent generated (block 311). The generation of the zero-biased exponent may be dependent on the zero-biased exponentiation algorithm selected. All zero-biased exponentiation algorithms are optimal for use in situations where there is insufficient memory to store a full set of precomputed vectors. For example, these algorithms are optimal for use when the maximum number of vectors that can be stored is between $2^{s-1}$ and $2^s-1$ making the largest possible window size r=s−1 for standard algorithms, but s for the zero-biased exponentiation algorithms.

Figure 4A:
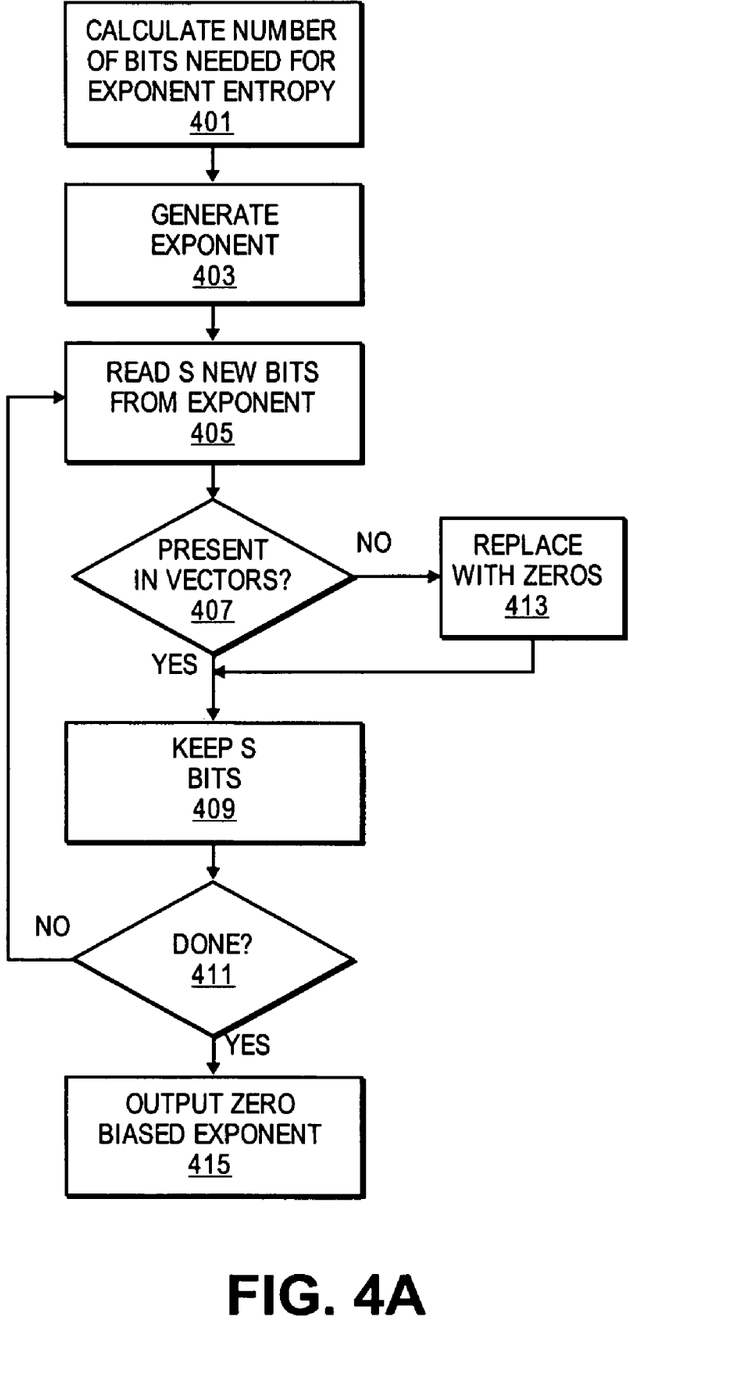
FIG. 4A is a flowchart of one embodiment of a process for exponent generation.

In one example embodiment, the zero biased exponentiation algorithm may be zero-biased fixed window exponentiation (ZBFWE) algorithm. This algorithm depends on the generation of an appropriate zero-biased exponent to calculate $A^X$ mod P. FIG. 4A is a diagram of one embodiment of a process for generating a zero-biased exponent for use with a ZBFWE algorithm.

In one embodiment, the number of bits necessary to maintain the entropy level of the original or standard randomly generated exponent that is n bits in length while using the reduced set of precomputed vectors must be calculated (block 401). The number of bits m must be greater than n such that the entropy level is maintained. One example formula for determining m is $$-\frac{nW}{\frac{M+1}{2^w}\log_2\left(\frac{1}{2^w}\right)+\frac{2^w-M-1}{2^w}\log_2\left(\frac{2^w-M}{2^w}\right)}.$$

In one embodiment, once the length is known then a randomly generated exponent Z is generated of length m (block 403). The exponent Z may be generated using any random number generator such that the entropy level n is maintained.

The exponent Z may then be processed as a sequence of bits from left to right. The exponent Z may be processed in window sized (W) chunks. The process reads the first W bits from the exponent (block 405). A determination is then made as to whether this sequence of bits is present in the precomputed vectors (block 407). The sequence itself may be utilized as an index into the vectors. In one embodiment, if the sequence exceeds the largest vector number M then the sequence is not present in the vectors. In another embodiment, a search or matching algorithm is used to determine the presence of a corresponding precomputed vector. If the sequence is not present in the vectors then it may be replaced with an equivalent number of zeros (block 413). In another embodiment, a new exponent Z may be created through this zero-biasing process by concatenation. The zeros are then concatenated onto the new Z.

If however, the sequence is present in the vectors then the sequence is kept (block 409). In another embodiment, the sequence is concatenated onto the new Z. A check may then be made if the end of the exponent Z has been reached (block 411). If the end has not been reached then the process advances to the next window by reading the next s bits (block 405). If the process has reached the end of the exponent Z then the modified Z is output or returned to be processed by the ZBFWE (block 415).

Figure 5A:
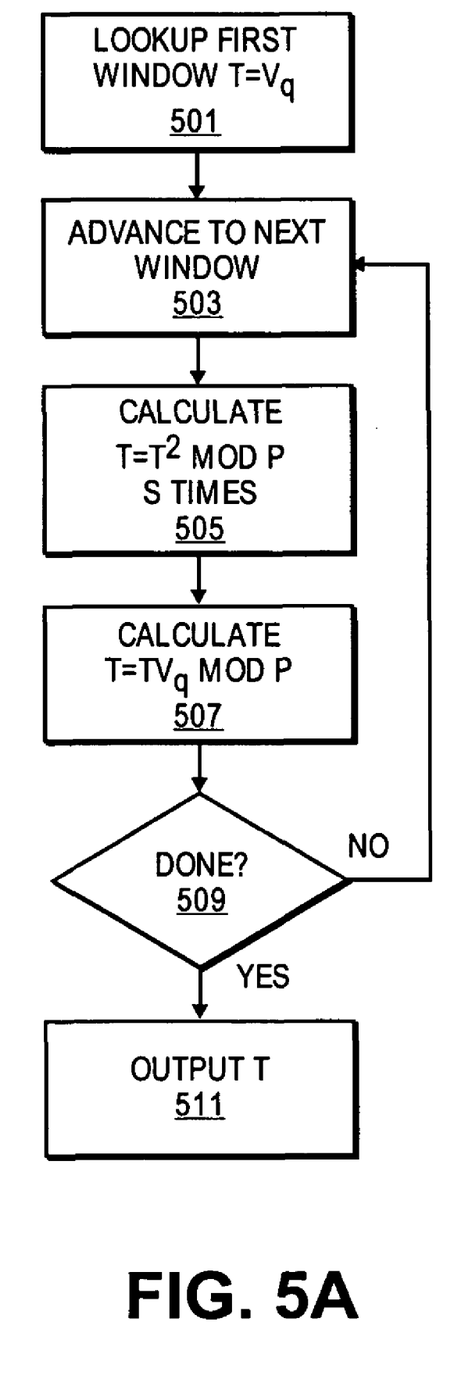
FIG. 5A is a flowchart of one embodiment of a process for exponentiation.

FIG. 5A is a flowchart of one embodiment of a zero-biased fixed window exponentiation algorithm. This algorithm utilizes a reduced set of vectors in comparison to what a standard fixed window algorithm would otherwise for a given window size W. These vectors are precomputed and stored with indexes corresponding to the sequence. The vectors V maybe indexed (i) such that $V_i=A^i \mod P$ for all i in M. As used herein below q indicates the present sequence in the window.

In one embodiment, the process of exponentiation proceeds left to right across the exponent. A lookup is conducted of the first window (block 501). The lookup uses the first window sequence q as an index into the vectors V. An accumulator T is set to this value, $T=V_q$. However, in the case that q is 0 then T is set to 1. The algorithm then proceeds to the next window (block 503).

The total T is calculated as $T^2 \mod P$, which is repeated W times (block 505). Then if the sequence q is present in M, then T is calculated as $T=T V_q \mod P$ (block 507). The vectors V do not include 0. Thus, each 0 sequence does not involve a multiplication. A check is then made as to whether the last window has been reached (block 509). If the last window has not been reached then the process continues with the next window (block 503). If the last window has been reached, then the exponentiation is complete and the value T is output as the result (block 511).

The following is an example application of the zero-biased number generation and exponentiation for the ZBFWE algorithm.

ZBFWE Execution Example:

Parameters: m = 15, W = 3, t = m/W = 5, M = 4, M = {1, 2, 3, 4, 5}.
Suppose that the initial randomly selected m-bits string is $Z = 21050_{(10)} = [101001000111010]_{(2)}$.
When Z is written as t W-bits windows reads
$Z = [(101)(001)(000)(111)(010)]_{(8)}$
The ZBSKG algorithm produces a Zero Biased string by the following changes:

(101) → (101) (no change; current value belongs to M)
(001) → (001) (no change; current value belong to M)
(000) → (000) (no change needed; zero string)
(111) → (000) (change to 0; current value does not belong to M)
(010) → (010) (no change; current value belongs to M)

Finally, the ZBSKG algorithm outputs the zero-biased exponent $Z=(20994)_{(10)}=[(101)(001)(000)(000)(010)]_{(b)}$. This allows for using ZBFEW algorithm with only M=5 elements pre-computed table M.

The fixed window steps of the ZBFEW algorithm are:

M = {A mod P, $A^2$ mod P, $A^3$ mod P, $A^4$ mod P, $A^5$ mod P}
$E_4 = 5$: $T=A^5$ mod P (for the first block (window) $E_4 = 4$, and $A^5$ mod P is read from M)
$E_3 = 1$: (repeat w=3 times) $T=T^2$ mod P, $T=T^2$ mod P, $T=T^2$ mod P, and $T = T * A^1$ mod P ($\rightarrow T = A^{41}$ mod P)
$E_2 = 0$: (repeat w=3 times) $T = T^2$ mod P, $T = T^2$ mod P, $T = T^2$ mod P, and no multiplication ($\rightarrow T = A^{328}$ mod P)
$E_1 = 0$: (repeat w = 3 times) $T = T^2$ mod P, $T = T^2$ mod P, $T = T^2$ mod P, and no multiplication ($\rightarrow T = A^{2624}$ mod P)
$E_0 = 0$: (repeat w = 3 times) $T = T^2$ mod P, $T = T^2$ mod P, $T = T^2$ mod P, and $T = T * A^2$ mod P ($\rightarrow T = A^{20994}$ mod P)

Altogether, these steps require 12 modular squares and 2 modular multiplications.

In another embodiment, the windowing algorithm may be a zero biased sliding window exponentiation (ZBSWE) algorithm. The ZBSWE also requires a zero-biased exponent to be generated. The ZBSWE is utilized in cases where the sliding window exponentiation algorithm may typically be used, except that there is insufficient memory for the $2^{W-1}$ vectors V required.

Figure 4B:
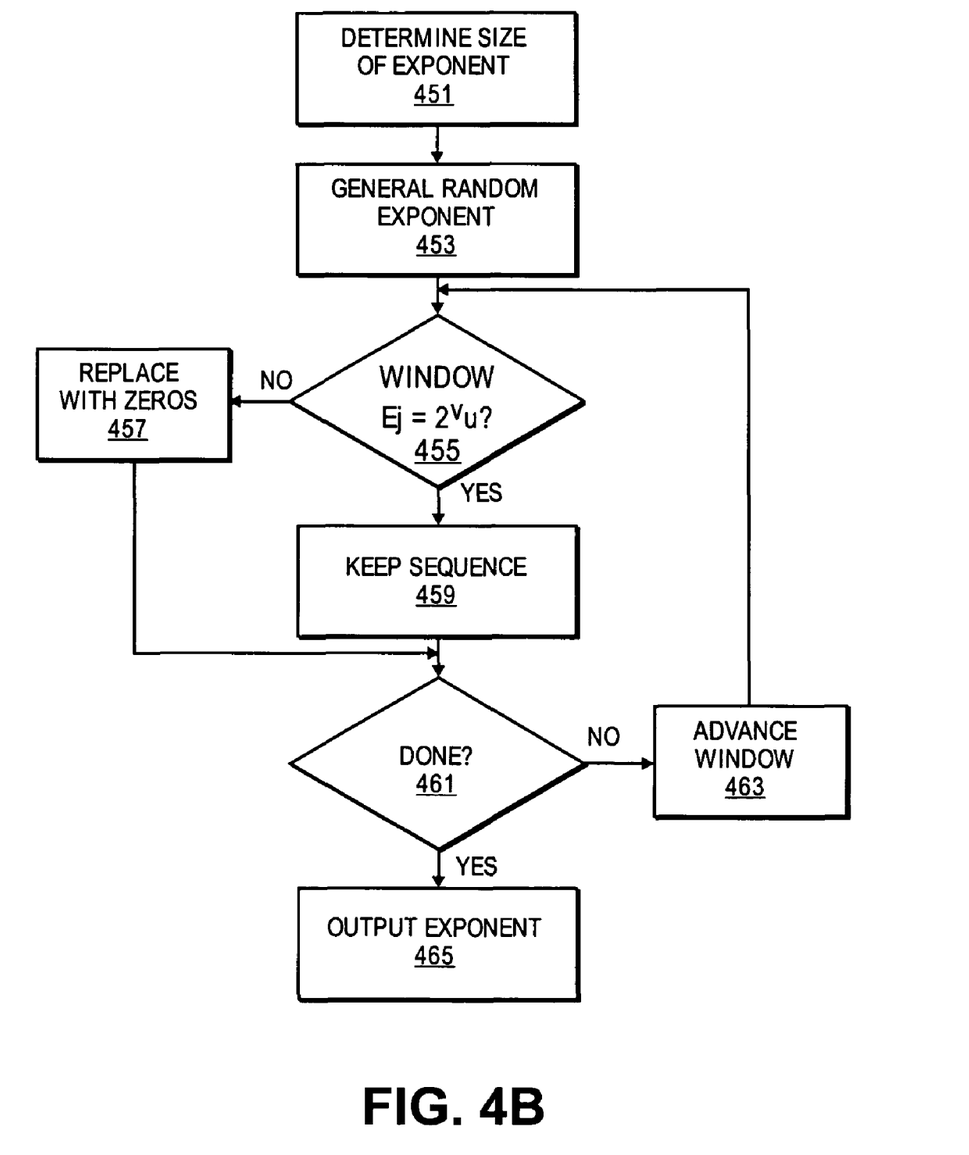
FIG. 4B is a flowchart of one embodiment of a process for exponent generation.

FIG. 4B is a flowchart of one embodiment of a zero-biased exponent generation algorithm for use with a ZBSWE. The process determines the size m of a random exponent Z to be utilized in the exponentiation that utilizes the reduced set of vectors (block 451). The size m may be determined using the following formula:

$$\frac{n(W+1)}{\frac{M}{2^{W-1}}\log_2+\frac{2^{W-1}-M}{2^{W-1}}\log_2\left(\frac{2^{W-1}-M}{2^{W-1}}\right)+2}.$$

This formula may be used to maintain the same level of entropy n that would be present in the exponent for a standard sliding window exponentiation algorithm.

An exponent Z is then generated with length m (block 453). This exponent Z may be generated using any random number generator that provides an even distribution over m. The m bit string of exponent Z is organized as pairs $F_0$ and $\Delta_0$, $F_1$ and $\Delta_1$, $F_2$ and $\Delta_2$, . . . etc, where F represents an s sized sequence an Δ represents an offset of 0's between the windows. Each window starts with the number 1 and the offset may be 0 if no 'gap' exists.

The exponent Z is then processed from left to right. Each window F is tested to determine if the current window F is equal to $2^v u$, where v is less than or equal to W−1 (e.g., v may be the largest power of 2 that divides F), and u is an odd number that is less than $2^W-1$ (block 455). If the value of the window F is equal to $2^v u$ then it is present in the precomputed vectors V that form the set M. If the window value is not present in M, then the sequence is replaced with an equivalent number of zeros (block 457). In another embodiment, the zeros may be concatenated onto a new exponent Z. If the sequence is present in M, then the sequence is kept or concatenated onto the new exponent Z (block 459).

A test may then be made to determine if the exponent Z has been completely processed (block 461). If the process has not come to the end of the exponent Z then the window F is advanced (block 463) and the next window is tested (block 455). If the process has come to the end then the modified exponent Z is output for use by the ZBSWE algorithm (block 455).

Figure 5B:
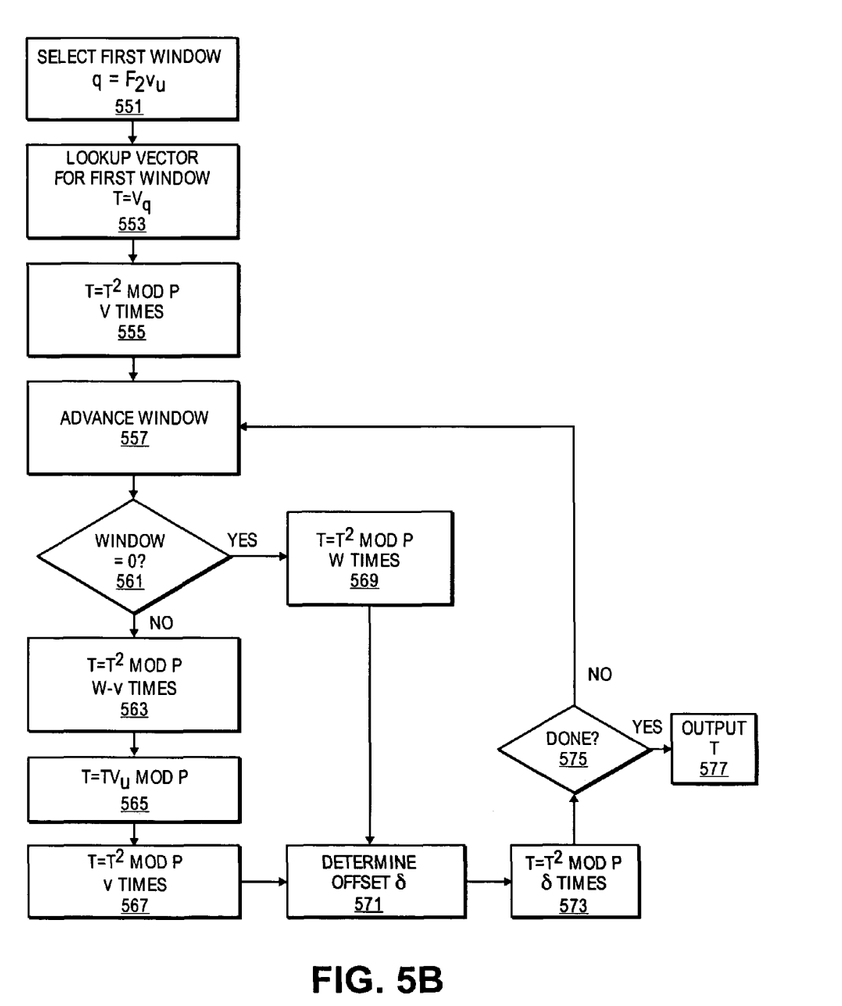
FIG. 5B is a flowchart of one embodiment of a process for exponentiation.

FIG. 5B is a flowchart of one embodiment of a process for the ZBSWE algorithm. The process determines the next window to be processed containing sequence q by indexing into the exponent Z at $F_2{}^v{}_u$ (block 551). The value q is used as an index for the vector V to determine an initial value for the accumulator T (block 553). The value T is then further calculated as $T=T^2$ mod P, which is repeated v times (block 555). The window is then advanced to the next window for processing (block 557). The next window may again be indexed using $F_2{}^v{}_u$.

The value q of the new window is tested to determine if it is a zero value (block 561). If the value is a zero value then T may be recalculated as $T=T^2$ mod P, which is repeated W times (block 569). The process then goes on to determine the offset δ to the next window (block 571). T is again recalculated as $T=T^2$ mod P, which is repeated δ times. A check is then made to determine if the processing of Z has completed (block 575). If it has not, the process advances to the next window (block 557). If the process has completed then the accumulator T is output as the end result of the exponentiation.

If the value q of the window is not equal to zero, then T is recalculated as $T=T^2$ mod P, which is repeated W−v times (block 563). T is further recalculated as $T=TV_u$ mod P (block 565) and again as $T=T^2$ mod P, which is repeated v times (block 567). The process continues to determine the offset δ to the next window (block 571). T is again recalculated as $T^2$ mod P, which is repeated δ times. A check is then made to determine if the processing of Z has completed (block 575). If it has not, the process advances to the next window (block 557). If the process has completed then the accumulator T is output as the end result of the exponentiation.

The following is an example application of the ZBSWE algorithm.

Parameters: $X=(38165393)_{(10)}=(10010001100101101110010001)_{(2)}$ W=4, and M=4. The exponent string X is partitioned as (1001) (000) (1100) ( ) (1011) (0) (1000) ( ) (1) ( ). The zero biased modified string is generated from X in a way that only $A^1, A^3, A^5, A^7$ need to be used in the ZBSWE algorithm. Therefore, the exponent is changed to (0000) (000) (1100) ( ) (0000) (0) (1100) (0) (1000) ( ) (1) ( )=$(394129)_{(10)}$. Now the ZBSWE algorithm can be implemented as follows:

```
T = A
E₅ Δ₅ = (0000) (000)
    T = T (do nothing) (→T = A¹)
E₄ Δ₄ = (1100) ( )
    T=A³, T = T², T = T² (→T = A¹²)
E₃ Δ₃ = (0000) (0)
    T = T², T = T², T = T², T = T², T = T * T², T = T² (→T = A³⁸⁴)
E² Δ² = (1110) (0)
    T = T², T = T², T = T², T = T * A⁷, T = T², T = T² (→T = A¹²³¹⁶)
E¹ Δ¹ = (1000) ( )
    T = T², T = T * A, T = T², T = T², T = T² (→T = A¹⁹⁷⁰⁶⁴)
E₀ Δ₀ = (1) ( )
    T = T², T = T * A (→T = A³⁹⁴¹²⁹)
```

In one embodiment, the zero-biased exponentiation and zero-biased exponent generation algorithms as well as the encryption program are implemented in hardware. In another embodiment, these components may be implemented in software (e.g., microcode, assembly language, firmware or higher level languages). These software implementations may be stored on a machine-readable medium. A "machine readable" medium may include any medium that can store information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
    calculating a first computational cost for generating a key using a first exponentiation algorithm on a first exponent;
    calculating a second computation costs for generating the key using a second exponentiation algorithm on a second exponent, the second exponent having a longer bit length than the first exponent and having the same entropy level as the first exponent; and
    selecting by a computer system one of the first exponent and first exponentiation algorithm or the second exponent exponentiation algorithm to generate the key,
    wherein the second exponentiation algorithm is one of a zero-biased fixed window exponentiation algorithm or a zero-biased sliding window exponentiation algorithm.

2. A method comprising:
    calculating a first computational cost for generating a key using a first exponentiation algorithm on a first exponent;
    calculating a second computation costs for generating the key using a second exponentiation algorithm on a second exponent, the second exponent having a longer bit length than the first exponent and having the same entropy level as the first exponent; and
    selecting by a computer system one of the first exponent and first exponentiation algorithm or the second exponent exponentiation algorithm to generate the key
    modifying the second exponent to generate a zero-biased exponent.

3. The method of claim 2, wherein modifying the second exponent comprises:

altering sequences of the second exponent to decrease a requisite number of multiplications during application of the second exponentiation algorithm.

4. A non-transitory machine readable medium having instructions stored therein, which when executed cause a machine to perform a set of operations comprising:
    calculating a cost ratio for execution of a first exponentiation algorithm given a first exponent and execution of a second exponentiation algorithm given a zero-biased modification of the second exponent;
    comparing the cost ratio to a predetermined threshold; and
    utilizing the zero-biased modification to generate a key using the second exponentiation algorithm if the threshold is exceeded.

5. The machine readable medium of claim 4, having further instructions stored therein causing the machine to perform further operations comprising:
    utilizing the first exponent and first exponentiation algorithm in response to the threshold being not exceeded.

6. The machine readable medium of claim 4, having further instructions stored therein causing the machine to perform further operations comprising:
    calculating a size of the zero-biased modification to maintain an entropy level of the first exponent, the first exponent being randomly generated.

7. The machine readable medium of claim 4, wherein the first exponentiation algorithm is one of a fixed window exponentiation algorithm or a sliding window exponentiation algorithm.

8. The machine readable medium of claim 4, wherein the key is used in a Diffie-Hellman key exchange protocol.

9. A device comprising:
    a secret key generator component to generate a secret key using a first exponent;
    an agreed key generator component to generate an agreed key using the first exponent; and
    an exponentiation algorithm selector to select one of a standard exponentiation algorithm and a zero-biased exponentiation algorithm for use by the secret key generator and the agreed key generator.

10. The device of claim 9, wherein the exponentiation algorithm selector generates a zero-biased exponent for use by the zero-biased algorithm.

11. The device of claim 9, wherein the zero-biased exponentiation algorithm is one of a zero-biased fixed window exponentiation algorithm or a sliding window exponentiation algorithm.

12. A system comprising:
    a static random access memory (SRAM) device;
    an encryption component coupled to the SRAM, the encryption component to execute a key-exchange protocol and select an optimum exponentiation algorithm between a standard windowing exponentiation algorithm and a zero-biased windowing exponentiation algorithm for generating keys.

13. The system of claim 12, wherein the SRAM and encryption component form a part of a smartcard.

14. The system of claim 12, wherein the encryption component modifies an exponent to be a zero-biased exponent.

* * * * *